(12) United States Patent
Su

(10) Patent No.: US 6,906,927 B2
(45) Date of Patent: Jun. 14, 2005

(54) COMPUTER CASE HAVING PULL BAR STRUCTURE FOR REMOVING FRONT PANEL

(75) Inventor: Chih-Min Su, Taipei (TW)

(73) Assignee: Tatung Co., Ltd., Taipei (TW)

(*) Notice: Subject to any disclaimer, the term of this patent is extended or adjusted under 35 U.S.C. 154(b) by 31 days.

(21) Appl. No.: 10/714,969

(22) Filed: Nov. 18, 2003

(65) Prior Publication Data

US 2004/0240186 A1 Dec. 2, 2004

(30) Foreign Application Priority Data

May 30, 2003 (TW) ...................................... 92209996 U

(51) Int. Cl.⁷ ................................................ G06F 1/16
(52) U.S. Cl. .................... 361/727; 312/223.3; 206/320; 400/713
(58) Field of Search ................................ 361/686–687, 361/724–727, 801, 806, 818, 752–754; 312/223.1–223.6; 400/713–714; 206/320, 576

(56) References Cited

U.S. PATENT DOCUMENTS

| | | | | |
|---|---|---|---|---|
| 6,297,948 B1 | * | 10/2001 | Buican et al. | 361/683 |
| 6,816,391 B2 | * | 11/2004 | Davis et al. | 361/818 |
| 2004/0240186 A1 | * | 12/2004 | Su | 361/727 |

* cited by examiner

*Primary Examiner*—Hung Van Duong
(74) *Attorney, Agent, or Firm*—Bacon & Thomas PLLC

(57) ABSTRACT

A computer case having a pull bar structure for removing a front panel has a pull bar slidably mounted on the bottom wall of the case. The front wall of the case is provided with a front panel. To remove or to mount the front panel, only one side panel has to be taken off first. The pull bar is then pulled so as to decouple a bulged fixing dot on a pressing end thereof with a fixing hole on a fixing member of the front panel. A computer case having a pull bar structure therefore simplifies the process of removing the front panel and saves a significant amount of time.

5 Claims, 6 Drawing Sheets

COMPUTER CASE HAVING PULL BAR STRUCTURE FOR REMOVING FRONT PANEL

FIELD OF THE INVENTION

The present invention relates to pull bar structures for removing a front panel of a computer case, and more particularly to a pull bar structure that simplifies the processes of connecting/disconnecting a front panel with a computer case.

BACKGROUND OF THE INVENTION

Because of the rapid development of the information industry, personal computers have become a common appliance in every family. Many of the users are now equipped with basic abilities of maintaining and upgrading the hardware of a personal computer.

The above-mentioned personal computers mainly include a case that not only contains the computing components but also plays the role of structural support. A front panel, a left-side panel and a right-side panel for ornamenting the case and reinforcing the structure cover the case. When moving the computer device, the major force is applied to the front panel. To prevent the front panel from falling off the case in a process of moving, the right-side panel and the left-side panel are designed to be locked with the front panel in the prior art.

However, to maintain or upgrade the components within the computer case, both of the left-side panel and the right-side panel should be removed before taking off the front panel, which complicates the removing process and wastes a lot of time.

SUMMARY OF THE INVENTION

Accordingly, the primary objective of the present invention is to provide a pull bar structure in a computer case that can simplify the process of removing the front panel and therefore save a significant amount of time.

To achieve the objective, the present invention as a computer case having a pull bar structure for removing a front panel comprises a case, a front panel and a pull bar, wherein the case includes a front wall and a bottom wall; the bottom wall connects with the bottom edge of the front wall; an aperture is formed on the front wall; a first guiding means is transversely formed on the bottom wall.

The front panel is mounted on the front wall of the case. The front panel is further provided with a fixing member uprightly extended from the backside thereof. The fixing member is located corresponding to the aperture of the front wall, with a fixing hole transversely formed at the free end thereof.

The pull bar includes a second guiding means and a pressing plate. A bulged fixing dot is formed on the pressing plate. The second guiding means is located corresponding to the first guiding means. The second guiding means is slid with the first guiding means to achieve the pull bar transversely slides on the bottom wall so that the pull bar can slide in a transverse direction on the bottom wall, and to achieve a slidable connection of the bulged fixing dot with the fixing hole.

Therefore, in either of mounting and removing processes of the front panel, removing both of the right-side panel and the left-side panel is not necessary. To remove the front panel of the present invention, only one of the side panels is removed first, and then the pull bar is pulled outwardly so that the bulged dot thereof is decoupled with the fixing hole of the front panel. Compared with the conventional computer cases, the present invention indeed simplifies the mounting/removing process of a front panel and thus saves people a significant amount of time.

Further, a fixing tab is formed on the front wall of the case, which is uprightly extended from the rim of the aperture toward the interior of the case. A bulged locking dot is formed on the fixing tab, and the fixing member of the front panel is provided with a locking hole located corresponding to and engaging with the bulged locking dot when the front panel is mounted on the front wall.

The various objects and advantages of the present invention will be more readily understood from the following detailed description when read in conjunction with the appended drawings.

DESCRIPTION OF THE PREFERRED EMBODIMENT

Figure 1:
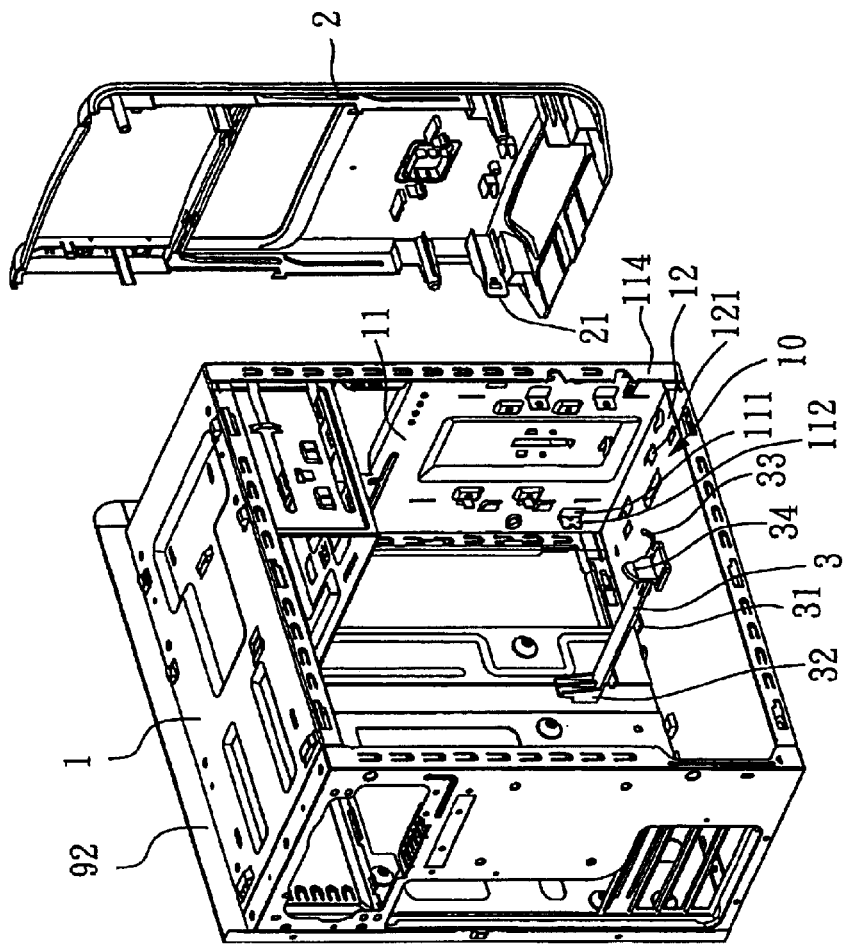
FIG. 1 is an exploded perspective view of a computer case having a pull bar structure for removing a front panel according to the present invention.

Referring to FIG. 1, the present invention as a computer case having a pull bar structure for removing a front panel includes a case 1, composed of a front wall 11, a bottom wall 12, a left-side panel 91 and a right-side panel 92. The bottom wall 12 connects with the bottom edge of the front wall 11. A front panel 2 is further mounted on the front wall 11, on which an aperture 111 and a fixing tab 112 are formed. The fixing tab 112 is integrally extended from the rim of the aperture 111 toward the interior of the case 1. Referring FIG. 4, a bulged locking dot 113 is formed on one side of the fixing tab 112. A first guiding means 121 is transversely formed on the bottom wall 12 of the case 1, which is a plurality of slots in this preferred embodiment.

Figure 3A:
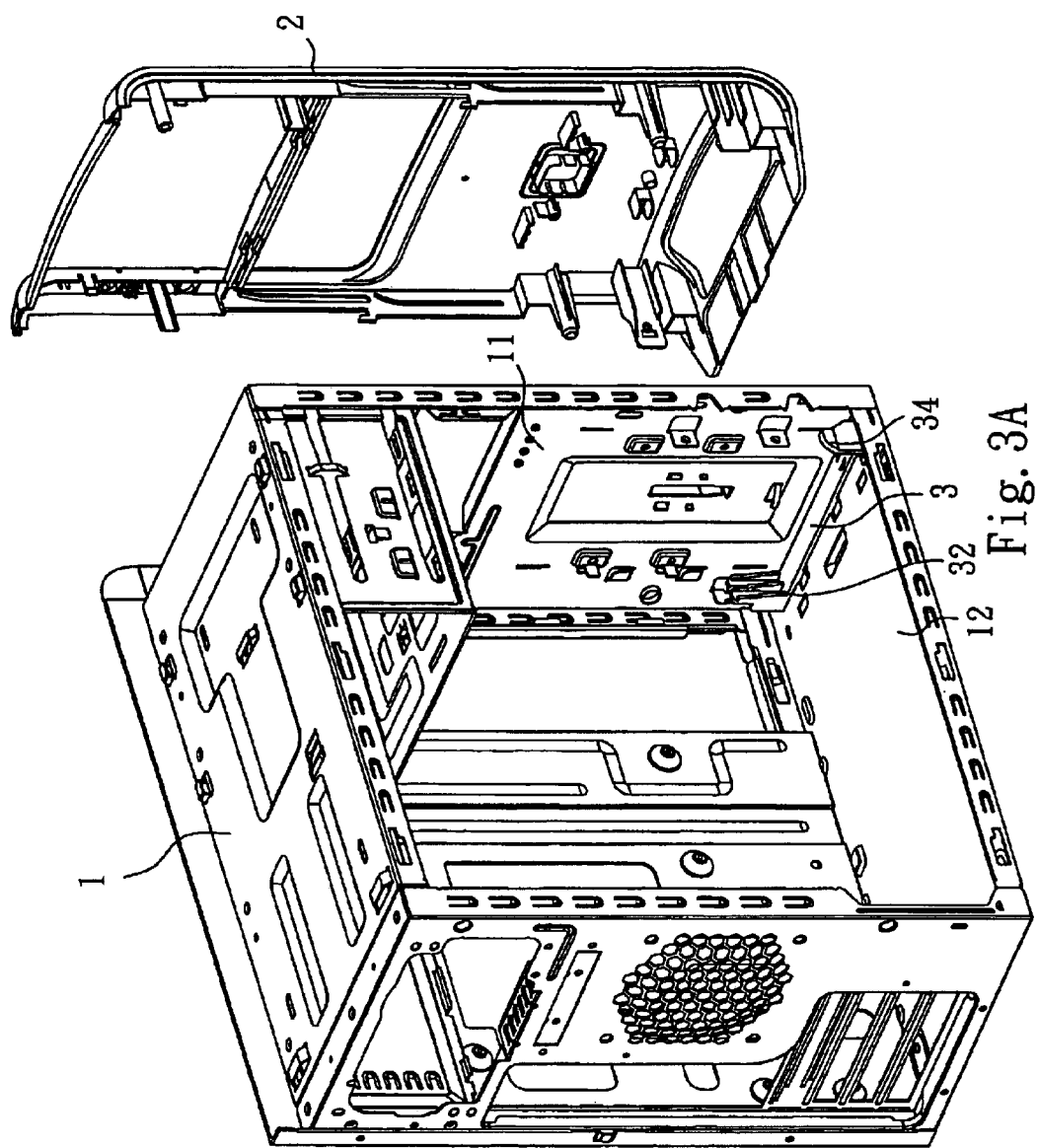
FIG. 3A illustrates is a computer case having a pull bar structure for removing a front panel according to the present invention as the front panel is removed from the case.
Figure 3B:
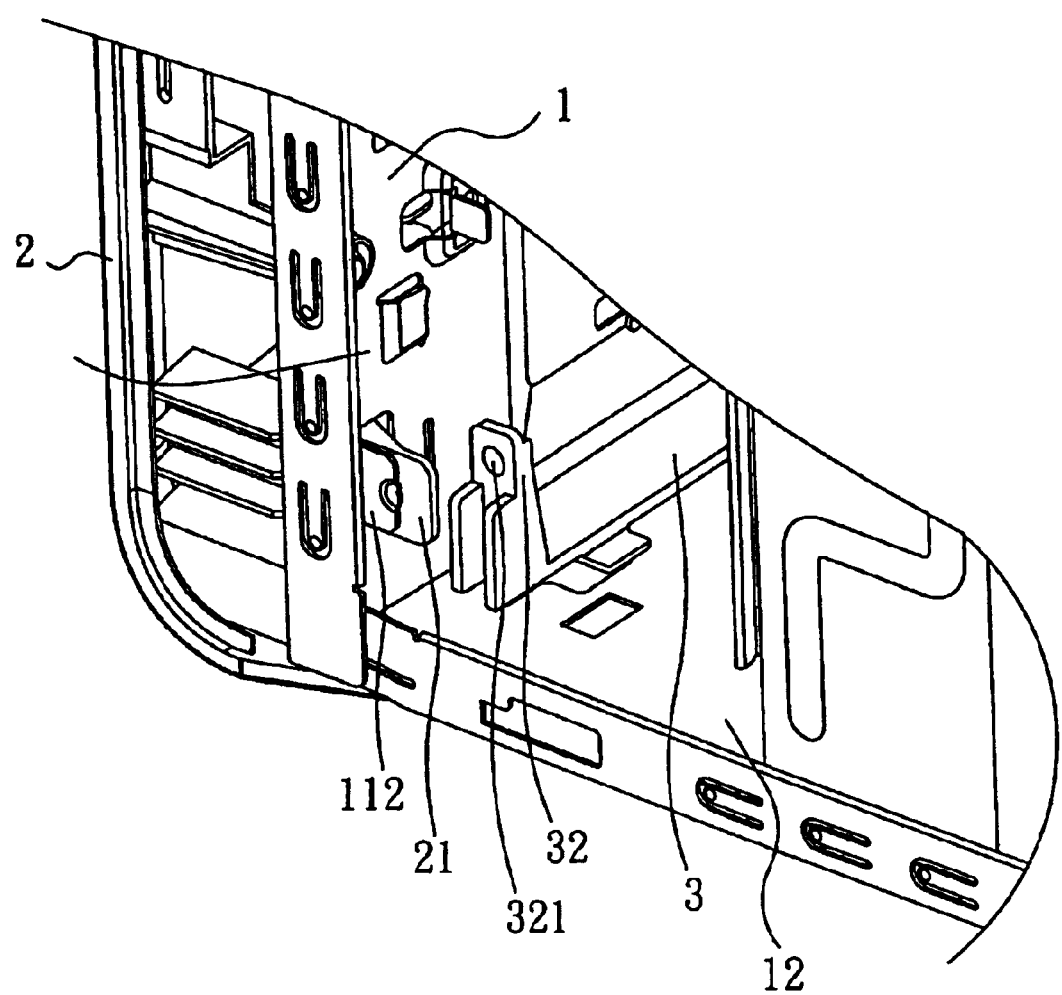
FIG. 3B is a perspective view of another angle of the present invention corresponding to FIG. 3A.
Figure 4:
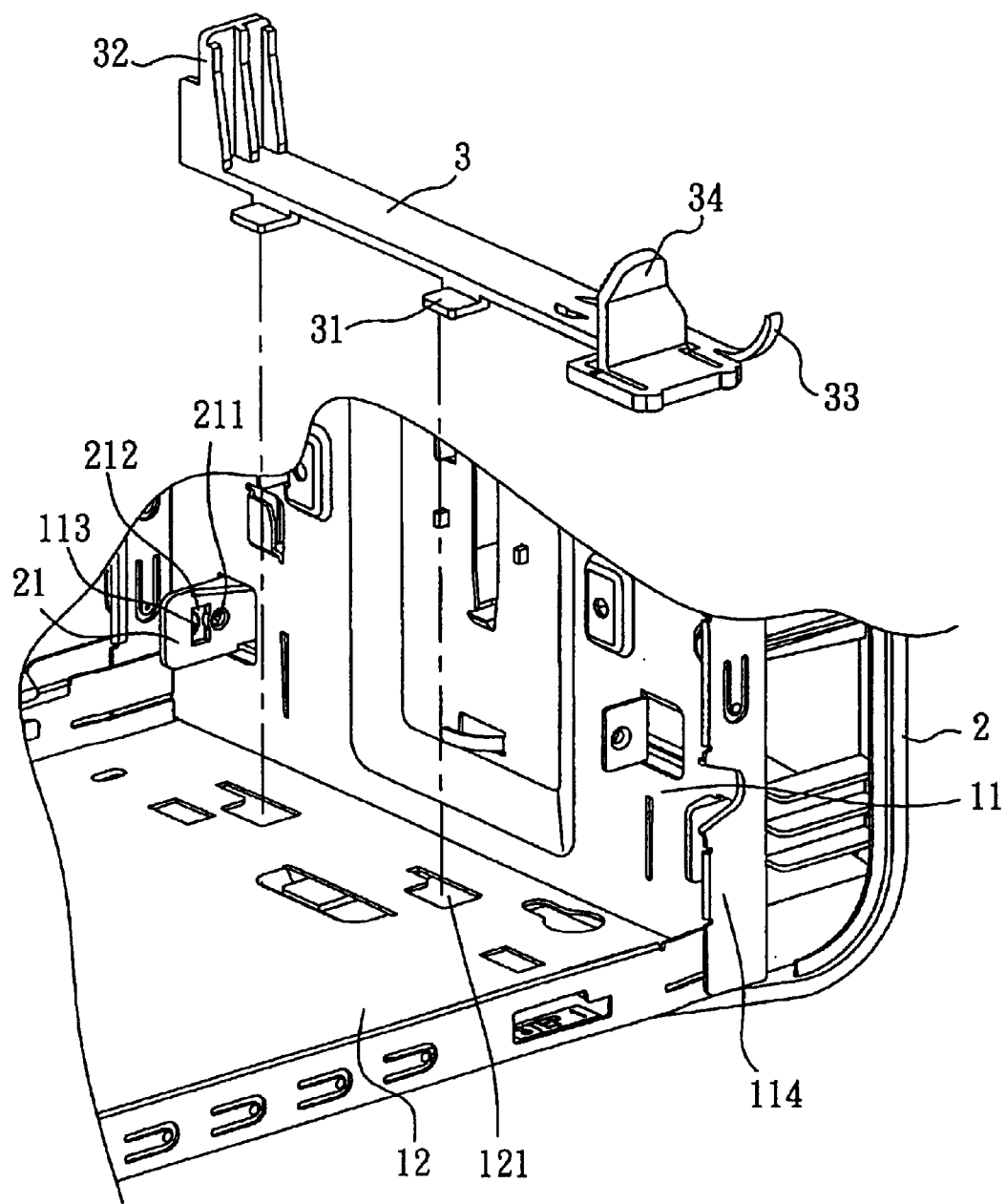
FIG. 4 is an enlarged perspective view of the fixing member and the fixing tab of the present invention.

The above-mentioned front panel 2 is provided with a fixing member 21, which is uprightly extended from the inner side of the front panel 2. A locking hole 212 is formed at the free end of the fixing member 21, and a fixing hole 211 is transversely formed at the free end of the fixing member 21. As shown in FIG. 4, a pull bar 3 includes a second guiding means 31 and a pressing plate 32, on which a bulged fixing dot 321 is formed (as shown in FIG. 3B). In this preferred embodiment, the second guiding means 31 is a plurality of sliding pieces, which can be slidably engaged with the first guiding means 121, a plurality of corresponding transverse slots on the bottom wall 12, so that the pull bar 3 can slide transversely on the bottom wall 12 of the case 1.

Referring to FIG. 1, FIG. 2A, FIG. 2B, and FIG. 4, when the front panel 2 is mounted onto the front wall 11 of the case 1, the fixing member 21 thereof is accordingly inserted into the aperture 111 on the front wall 11, and then becomes coupled with the fixing tab 112 of the front wall 11, and the bulged locking dot 113 is locked into the locking hole 212 of the fixing member 21. The pull bar 3 is then actuated to slide transversely on the bottom wall 12, so that the pressing plate 32 thereof further pinches the fixing member 21 onto the fixing tab 112. The bulged fixing dot 321 on the pressing plate 32 is thereby locked into the fixing hole 211 on the fixing member 21. Therefore, the front panel 2 is substantially mounted on the front wall 11.

Figure 2A:
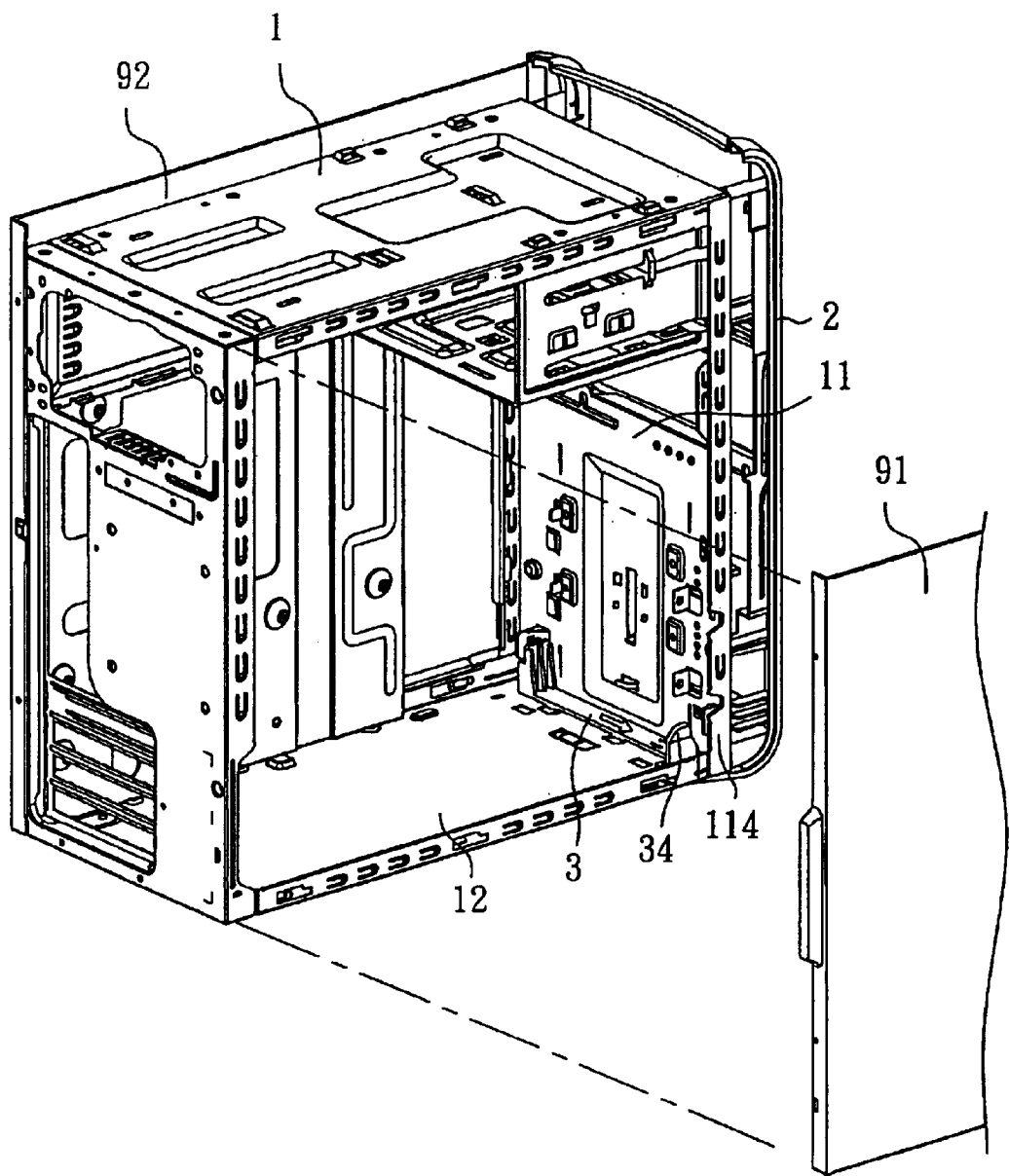
FIG. 2A illustrates is a computer case having a pull bar structure for removing a front panel according to the present invention as the front panel is being removed from the case.
Figure 2B:
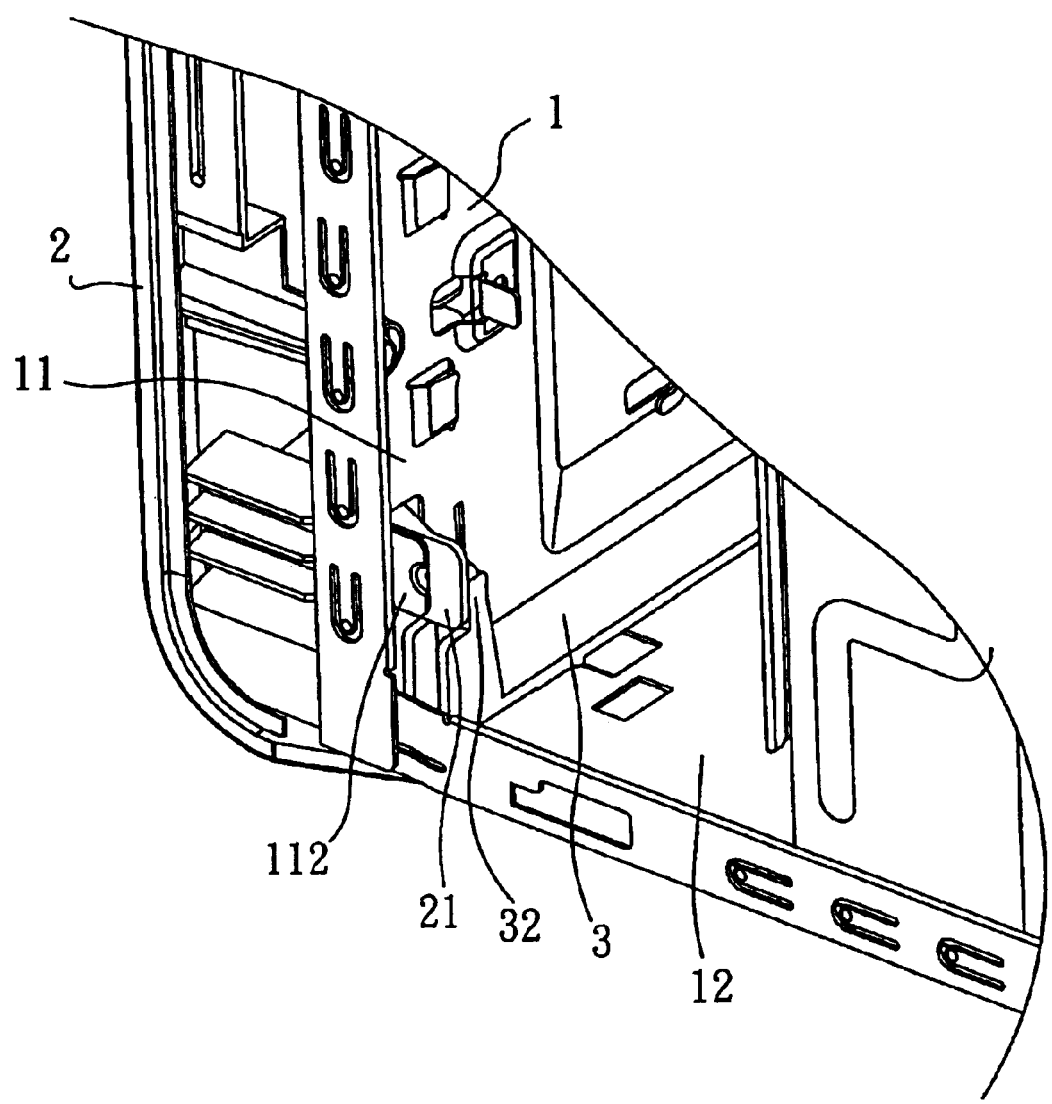
FIG. 2B is a perspective view of another angle of the present invention corresponding to FIG. 2A.

To remove the front panel 2, the left-side panel 91 is firstly taken off, and an operation portion 34 of the pull bar 3 is pulled so as to slide the pull bar 3 along the bottom wall 12 in the direction as indicated by an arrow in FIG. 2A. Meanwhile, the bulged fixing dot 321 of the pressing plate 32 is departed from the fixing hole 211 on the fixing member 21 of the front panel 2. Referring to FIG. 3A and FIG. 3B, the front panel 2 is rotated about one side of the fixing tab 112 on the front wall 11 over a small angle, so as to eject the locking hole 212 on the fixing member 21 out of the bulged locking dot 113 on the fixing tab 112 of the front wall 11. The front panel 2 can then be taken off the case 1 to complete the removing process. It should be noted that, in either of mounting and removing processes of the front panel 2, removing right-side panel 92 is not necessary, as shown in FIG. 1. Compared with the conventional computer cases, the present invention indeed simplifies the mounting/removing process of a front panel and thus saves people a significant amount of time.

Referring to FIG. 4, one lateral edge of the front wall 11 of the above-mentioned case 1 can be perpendicularly folded to form a lateral skirt 114, which extends onto a lateral side of the case 1. A curved resilient arm 33 is extended from an end of the pull bar 3 and adjacent to the operation portion 34 of the pull bar 3, in a corresponding position to the lateral skirt 114. When the operation portion 34 of the pull bar 3 is driven and then the pull bar 3 slides on the bottom wall 12, the resilient arm 33 provides a cushioning effect that can reduces the noise generated as the pull bar 3 collides with the case 1.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer case having a pull bar structure for removing a front panel comprising:
   a case including a front wall and a bottom wall, said bottom wall connecting with a bottom edge of said front wall, an aperture being formed on said front wall, a first guiding means being transversely formed on said bottom wall;
   a front panel mounted on said front wall of said case, said front panel being provided with a fixing member uprightly extended from a backside thereof, said fixing member being on a location corresponding to insert into said aperture of said front wall, a fixing hole being transversely formed at a free end of said fixing member; and
   a pull bar including a second guiding means and a pressing plate, a bulged fixing dot being formed on said pressing plate, said second guiding means being on a location corresponding to said first guiding means, said second guiding means being slid with said first guiding means to achieve said pull bar transversely slides on said bottom wall, and to achieve a slidable connection of said bulged fixing dot with said fixing hole.

2. The computer case having a pull bar structure for removing a front panel of claim 1, wherein a fixing tab is formed on said front wall of said case; said fixing tab is uprightly extended from a rim of said aperture toward an interior of said case; a bulged locking dot is formed on said fixing tab; said fixing member of said front panel is provided with a locking hole on a location corresponding to and engaging with said bulged locking dot when said front panel is mounted on said front wall.

3. The computer case having a pull bar structure for removing a front panel of claim 1, wherein one lateral edge of said front wall of said case is perpendicularly folded to form a lateral skirt, which extends to a lateral side of said case; a resilient arm is extended from an end of said pull bar for supporting against said lateral skirt.

4. The computer case having a pull bar structure for removing a front panel of claim 1, wherein said first guiding means is a plurality of transverse slots and said second guiding means is a plurality of sliding pieces.

5. The computer case having a pull bar structure for removing a front panel of claim 1, wherein said pull bar further includes an operation portion for controlling the transverse sliding movement of said pull bar on said bottom wall.

\* \* \* \* \*